United States Patent [19]

Sisco, Jr. et al.

[11] 3,926,652

[45] Dec. 16, 1975

[54] PERLITE ACETYLENE CYLINDER FILLER COMPOSITION

[75] Inventors: Willie J. Sisco, Jr., Southaven, Miss.; Cecil L. Long, West Memphis, Ark.; James M. Kifer, Memphis, Tenn.

[73] Assignee: Coyne Cylinder Company, San Francisco, Calif.

[22] Filed: Apr. 26, 1974

[21] Appl. No.: 464,380

[52] U.S. Cl. ............ 106/118; 106/120; 106/DIG. 2
[51] Int. Cl.² ...................C04B 13/12; C04B 15/06; C04B 21/00
[58] Field of Search................ 106/118, 120, DIG. 2

[56] References Cited

UNITED STATES PATENTS 3,475,189    10/1969    Carter et al......................... 106/118

*Primary Examiner*—J. Poer
*Attorney, Agent, or Firm*—Townsend and Townsend

[57] ABSTRACT

An improved filler composition for acetylene containers made from lime, perlite, fibrous asbestos and water in which crushing strength and other advantages are obtained through the use of perlite of much smaller particle size than heretofore used in such compositions.

8 Claims, No Drawings

PERLITE ACETYLENE CYLINDER FILLER COMPOSITION

This invention relates to an improved filler composition useful for the storage of acetylene gas at elevated pressures. More particularly, the invention relates to such filler compositions containing lime, perlite, fibrous asbestos and water in which the perlite particle size is selected to improve crushing strength and other properties.

U.S. Pat. No. 3,475,189 describes the formulation of acetylene filler compositions made from lime, fibrous asbestos, water and perlite, optionally including diatomaceous earth and charcoal. The point of novelty in said patent is the inclusion of perlite as an element in the filler composition. While certain advantages are stated to flow from the use of perlite, a number of disadvantages are also present in the formulations described in said patent. Of most significance, the perlite formulations of said U.S. patent are stated to exhibit lower crushing strengths than conventional formulations. Another important practical consideration is the patent teaching that the perlite is wetted under vacuum and that the cylinders or containers which receive the formulations are to be filled under vacuum.

The present invention is an improvement on the teachings of said U.S. Pat. No. 3,475,189 in that the crushing strength of the filler composition have been increased by more than 100 psi without sacrificing any of the other advantages attendant the use of perlite. Thus, the formulations of this invention have desirably high compressive strengths and may be dried at substantially reduced times compared with the previously used conventional filler formulations. The present formulations also provide a greater consistency in achieving the desired high porosity as disclosed in said patent. Other advantages flowing from the new formulations of this invention are the elimination of the necessity of vacuum wetting of the perlite. Moreover, the formulations can be placed in the containers or cylinders with a conventional pump and do not require the vacuum filling described in said U.S. patent.

The foregoing advantages are achieved by utilization of perlites having much smaller particle sizes than that employed in the prior art. Thus, the Permalite No. 430 described in said U.S. patent is a relatively large particle size expanded perlite. The perlites of this invention are finely ground powder of relatively small particle size. In general, the improvements of this invention can be achieved where the perlite selected has a particle size which passes through a 16 mesh screen. In the preferred embodiment the perlite selected has a majority of its particles of a size which will pass through a 100 mesh screen and preferably wherein the majority of the perlite particles will pass through a 325 mesh screen.

As a further departure from prior art formulations using perlite, the preferred embodiment of the present invention includes silica flour. The silica flour is a dense, finely divided material as compared with the previously used diatomaceous earth and co-acts with the finely divided perlite of this invention to provide the improved properties of this invention. As will be seen, silica flour may be the only other silica component of the formulation (aside from the perlite) or it may be used in combination with the previously employed diatomaceous earth. Two preferred formulations in accordance with the present invention contain the following ingredients:

| FORMULA A | Actual Amount | FORMULA B | Actual Amount |
|---|---|---|---|
| Lime Slurry (15.0 Wt % CaO) | 95 Gals | Lime Slurry (15.0 Wt % CaO) | 95 Gals |
| Diatomaceous Earth | 150 lbs | Silica Flour | 100 lbs |
| Silica Flour | 50 lbs | Perlite (Chem-Sil No. 50)* | 72 lbs |
| Perlite (Chem-Sil No. 2)* | 50 lbs | Perlite (Chem-Sil No. 2)* | 100 lbs |
| Fibrous Asbestos | 100 lbs | Asbestos | 75 lbs |
| Water | 105 Gals | Water | 105 Gals |
| | Weight % | | Weight % |
| Lime | 6.3 | Lime | 6.3 |
| Diatomaceous Earth | 7.1 | Silica | 4.7 |
| Silica Flour | 2.4 | Perlite No. 50 | 3.4 |
| Perlite | 2.4 | Perlite No. 2 | 4.8 |
| Asbestos | 4.7 | Asbestos | 3.6 |
| Water | 77.1 | Water | 77.2 |

*Chem-Sil No. 2 and No. 50 are perlite products of Chemrock Corporation. The particle sizes are as follows:

| Chem-Sil No. 2 | Chem-Sil No. 50 |
|---|---|
| 95–100% thru 100 mesh | 0–2% on 16 mesh |
| 65–75% thru 325 mesh | 3–10% on 20 mesh |
| | 15–30% on 30 mesh |
| | 35–50% on 50 mesh |
| | 15–30% on 100 mesh |
| | 5–15% thru 100 mesh |

The above Formula A and Formula B represent preferred compositions in which the components are in the approximate relative proportions indicated. Some variation from these figures will still produce the desired advantageous results. In actual practice anywhere from 95–105 gallons of water may be used to compensate for variations in bulk density, water absorption capability, etc., of the components and especially of the perlite. For example, the lime component can be varied to constitute between 6.1–6.5 percent by weight in each of the formulations. In Formula A the perlite concentration can be varied to constitute 1.5–2.4 percent by weight and may have the particle size of either Chem-Sil No. 2 or Chem-Sil No. 50. In Formula B the perlite having the particle size of Chem-Sil No. 50 can be varied to constitute 3.0–3.4 percent by weight.

A typical procedure for mixing the components of Formula A is as follows:

1. Break a 100 pound bag of asbestos into a mixer.
2. Let agitator fluff for 3 minutes.
3. Meter in 100 gallons of water and mix for 10 minutes.
4. Pour in perlite and mix for 10 minutes.
5. Start lime flowing into the mixer.
6. Add diatomaceous earth followed with turning of the mixer until all the diatomaceous earth is added.
7. Sift in the silica flour. Do not dump in all at once.
8. Start the mixer and mix for 20 minutes.

A typical procedure for mixing the components of Formula B is as follows:

1. Break 75 pounds of asbestos into a mixer.
2. Let agitator fluff for 3 minutes.
3. Meter in 95 gallons of water and mix for 10 minutes.
4. Pour in Chem-Sil No. 50 Perlite and mix for 10 minutes.
5. Start lime flowing into the mixer.
6. Add Chem-Sil No. 2 Perlite followed with turning of the mixer until all the perlite has been added.
7. Sift in the silica flour. Do not dump in all at once.
8. Start the mixer and mix for 20 minutes.

The formulations can then be placed in acetylene cylinders. As noted above, vacuum filling is not necessary and the cylinders can be filled with a conventional pump such as a Moyno pump. The filled cylinders are then indurated as is known in the art for times varying from 20–24 hours at temperatures ranging from 375°–450° F, primarily depending upon the cylinder size. A sharply reduced drying time is then observed as compared with the drying of prior art formulations.

Crushing tests on filler compositions made in accordance with this invention are 450–525 psi and porosities are approximately 91–92 percent.

What is claimed is:

1. In an acetylene container filler composition consisting essentially of lime, perlite, fibrous asbestos, and water, the improvement wherein substantially all of said perlite is of a particle size which passes through a 16 mesh screen.

2. An improved acetylene container filler composition in accordance with claim 1 wherein said filler composition further includes silica flour.

3. An improved acetylene container filler composition in accordance with claim 2 wherein at least the majority of the perlite in said composition has a particle size which will pass through a 100 mesh screen.

4. An improved acetylene container filler composition in accordance with claim 3 wherein the majority of said perlite has a perlite size which will pass through a 325 mesh screen.

5. An improved acetylene container filler composition in accordance with claim 4 wherein said filler composition also includes diatomaceous earth and is in accordance with the following formula:

|  | Percentage by Weight |
|---|---|
| lime | 6.1 – 6.5 |
| perlite | 1.5 – 2.4 |
| diatomaceous earth | 7.1 |
| silica flour | 2.4 |
| fibrous asbestos | 4.7 |
| water | 77.1. |

6. An improved acetylene container filler composition in accordance with claim 5 wherein said lime is 6.3 weight percent of said composition and said perlite is 2.4 weight percent of said composition.

7. An improved acetylene container filler composition in accordance with claim 3 and in accordance with the following formula:

|  | Percentage by Weight |
|---|---|
| lime | 6.1 – 6.5 |
| silica flour | 4.7 |
| perlite (particles pass through 16 mesh screen) | 3.0 – 3.4 |
| perlite (particles pass through 100 mesh screen) | 4.8 |
| fibrous asbestos | 3.6 |
| water | 77.2. |

8. An improved acetylene container filler composition in accordance with claim 7 wherein said lime is 6.3 weight percent of said composition and said perlite (particles pass through 16 mesh screen) is 3.4 weight percent.

* * * * *